United States Patent Office 3,040,019
Patented June 19, 1962

3,040,019
METAL-COMPLEX DYESTUFFS
Reinhard Neier, Basel, Switzerland, assignor to Sandoz Ltd., Basel, Switzerland, a Swiss firm
No Drawing. Filed Dec. 11, 1959, Ser. No. 858,858
Claims priority, application Switzerland Dec. 12, 1958
7 Claims. (Cl. 260—145)

This invention relates to metal-complex dyestuffs produced either by treating with a metal-yielding agent a monoazo compound of the formula

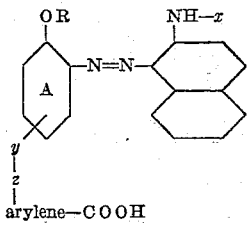

arylene—COOH                (I)

wherein
R stands for a hydrogen atom or a low molecular alkyl radical,
x for an alkyl, cycloalkyl, aralkyl or aryl radical which may be substituted with non-water-solubilizing substituents,
y for a carbonyl or sulfonyl group,
z, when y is a carbonyl group, for a simple linkage or, when y is a sulfonyl group, for a simple linkage or an —NH— or —N(alkyl)— group of low molecular weight,
arylene represents phenylene or naphthylene, and wherein the nucleus A and the arylene radical may contain further non-water-solubilizing substituents, or by treating with a metal-yielding agent a mixture of two or more monoazo dyestuffs of the Formula I but different from each other or a mixture of at least one monoazo compound of the above Formula I and one or more metallizable monoazo or disazo compounds.

The metallization is carried out in such a manner that a metal-containing azo dyestuff or a mixture of metal-containing azo dyestuffs is obtained, in which less than two metal atoms are linked to two molecules of the azo compound in complex combination.

By metallizing a mixture of two or more different monoazo compounds of Formula I or a mixture of at least one monoazo compound conforming to the above definition and one or more metallizable monoazo or disazo compounds of a different constitution, valuable mixed metal-complex dyestuffs are obtained, the shade and dyeing properties of which can to a great extent be adjusted to the particular use in view by changing the starting mixture of azo compounds.

The following may be enumerated as examples of suitable substituents x: alkyl radicals with one to five carbon atoms, hydroxyalkyl, methoxyalkyl or ethoxyalkyl radicals with two to five carbon atoms, cyclohexyl, methylcyclohexyl, benzyl, phenylethyl and, in particular, phenyl, naphthyl and tetrahydronaphthyl radicals which may contain chlorine atoms, methyl and methoxy radicals.

Halogen atoms preferably chlorine atoms, the methyl, methoxy or nitro groups are of primary interest as substituents of the phenylene or naphthylene radicals.

The metallization of the monoazo compounds of Formula I and their mixtures in conjunction with other metallizable monoazo or disazo compounds is effected preferably with compounds of chromium or of cobalt. The process is carried out to best advantage in aqueous solution or in an organic medium, e.g. formamide, dimethylformamide, ethyl glycol, or in the concentrated aqueous solution of an alkali-metal salt of a low molecular aliphatic monocarboxylic acid. It is advantageous to proportion the starting materials so that an amount of metal-yielding agent containing less than two but at least one atom of metal acts upon two molecules of azo dyestuffs.

Suitable chromium compounds are e.g. chromic fluoride, chromic sulfate, chromic formate, chromic acetate, chromic potassium sulfate and chromic ammonium sulfate. The chromates, e.g. sodium chromate or bichromate, potassium chromate or bichromate, are likewise highly suitable for metallizing the monoazo dyestuffs of Formula I and their mixtures in conjunction with other metallizable monoazo or disazo compounds. In the latter case, i.e. when chromates are used, it is advisable to work in a strongly caustic alkaline medium, to which reducing agents can be added if necessary.

Suitable cobalt compounds are e.g. cobaltous formate, cobaltous acetate and cobaltous sulfate. When metallization is carried out in the concentrated aqueous solution of an alkali-metal salt of a low molecular aliphatic monocarboxylic acid, water-insoluble metal compounds also can be employed, for example cobalt hydroxide or cobalt carbonate.

It is especially advantageous to carry out metallization in an aqueous or alkaline medium to which the metal compounds are added in presence of compounds which maintain the metal dissolved in complex combination in caustic alkaline medium, e.g. tartaric acid, citric acid and lactic acid.

The metal-complex compounds thus obtained are separated from the aqueous medium by the addition of salt, if necessary after previously running the organic metallizing solution into water, and are subsequently filtered off, washed if necessary and dried.

The metal-containing azo dyestuffs obtained are homogeneous or mixed metal-complex compounds in which essentially one atom of metal is combined with two molecules of the azo compound. The metal-complex compounds are in the main so-called 1:2 complexes wherein 1 molecule of the azo compound is combined with approximately 0.3 to 0.7 molecule of metal. The most interesting metal complex dyestuffs are those which are derived from monoazo compounds of Formula I having weights between 500 and 600.

The homogeneous or mixed metal-containing azo dyestuffs are soluble to more than 20 g./l. in water and dye wool, silk, synthetic polyamide fibers and leather from neutral or weakly acid dyebaths in green, blue, violet, gray, black or brown shades which are fast to light, washing, acid and alkaline milling, perspiration, water, sea water, potting, carbonizing, decatizing, chlorine, cross dyeing, peroxide bleaching, crocking, acids, alkalis, pressing, dry cleaning and heat treatments. Of course they also can be used for padding and printing these same materials. Those which possess sufficiently high solubility in organic solvents e.g. acetone, methylene chloride and dimethylformamide are also suitable for the mass coloration of artificial fibers spun from their solutions in organic solvents and of lacquers and plastics of all kinds.

In the following examples all parts and percentages are by weight and the temperatures are in degrees centigrade.

EXAMPLE 1

30.8 parts of 2-amino-1-hydroxybenzene-4-sulfonic acid-(2'-carboxy)-phenylamide are dissolved with 6 parts of sodium hydroxide in 60 parts of water. After the addition of 6.9 parts of sodium nitrite the solution is dropped with cooling into 40 parts of 30% hydrochloric acid and 40 parts of ice-water. The resulting suspension of the yellow diazo compound is heated to 50°, upon which a solution of 21.9 parts of 2-phenylaminonaphthalene in 150 parts of isopropyl alcohol is added dropwise. Formation of the monoazo dyestuff is completed after stirring for a lengthy period of time at 60°, whereupon the mass is immediately diluted with 300 parts of water and the precipitated dyestuff filtered off, dried and powdered.

To convert the red powder into the corresponding 1:2 chromium complex compound it is heated at 130° in 200 parts of formamide with the addition of 25 parts of crystallized chromic potassium sulfate. After 1 hour metallization is completed and the chromium-containing dyestuff formed is precipitated by diluting the mass with 300 parts of concentrated sodium chloride solution. It is filtered off and the filter cake dissolved with 16 parts of sodium hydroxide in 1000 parts of water, the chromium-containing azo dyestuff again precipitated by the addition of common salt, filtered off, dried and ground. It is a dark powder which is soluble in water (about 50 g./l.) and dyes wool, silk, synthetic polyamide fibers and leather from neutral to weakly acid baths in neutral gray shades.

To convert the metal-free monoazo compound into the 1:2 cobalt complex compound it is dissolved with 8 parts of sodium hydroxide in 1000 parts of water at 60° A mixture of 14.2 parts of crystallized cobaltous sulfate, 6 parts of sodium hydroxide and 126 parts of a 3% aqueous tartaric acid solution is added to the solution, and after stirring for 30 minutes at 60° the cobalt-containing dyestuff formed is precipitated from the mass with sodium chloride, filtered off, dried and ground. It is a dark powder which is soluble in water (more than 50 g./l.) and dyes wool, silk, synthetic polyamide fibers and leather in grayish green-blue shades; being readily soluble in acetone it is also suitable for dyeing spinning solutions of artificial fibers and lacquer media in grey-blue shades.

1 part of the cobalt-containing dyestuff described above is dissolved in 4000 parts of water at 40–50°. 100 parts of previously wetted wool are entered in this dyebath, 2 parts of 100% acetic acid added dropwise, and the temperature increased to the boil in 30 minutes and maintained at the boil for 45 minutes. The dyed wool is then removed, rinsed with water and dried. A grayish green-blue dyeing is obtained which possesses outstanding fastness to light, washing, milling, cross dyeing and perspiration.

100 parts of cellulose acetate with a content of 54–55% of splittable acetic acid are mixed with 300 parts of solvent, e.g., a mixture of 275 parts of acetone and 25 parts of methanol, and allowed to swell overnight. Next day 1 part of the cobalt-containing dyestuff of this example is dissolved in 60 parts of the same solvent and the solution added to the cellulose acetate solution with subsequent stirring until 60 parts of the solvent have evaporated. After the colored cellulose acetate solution has been filtered through cotton cloth and cotton pressure filters it is spun into filament in the same way as undyed acetate.

In the following Table I details of the structural composition of some particularly important homogeneous metal-complex dyestuffs are set forth. In column I the diazo component is named, in column II the coupling component, in column III the metal used for metal-complex formation, and in column IV the shade of the dyeing obtained on wool is noted.

Table I

| Example No. | (I) Diazo component | (II) Coupling component | (III) Metal | (IV) Shade of dyeing on wool |
|---|---|---|---|---|
| 2 | 2-amino-1-hydroxy-benzene-4-sulfonic acid-(2'-carboxy)-phenylamide. | 2-(3'-chloro)-phenylamino-naphthalene. | Co Cr | Blue-gray. Neutral gray. |
| 3 | 2-amino-1-hydroxy-benzene-5-sulfonic acid-(2'-carboxy)-phenylamide. | 2-(2'-methyl)-phenylamino-naphthalene. | Co Cr | Blue. Gray. |
| 4 | 2-amino-1-hydroxy-benzene-4-sulfonic acid-(4'-carboxy)-phenylamide. | 2-(2'-methyl)-4'-chlorophenylaminonaphthalene. | Co Cr | Blue-gray. Neutral gray. |
| 5 | 2-amino-1-hydroxy-benzene-5-sulfonic acid-(3'-carboxy)-phenylamide. | 2-(4'-methoxy)-phenylamino-naphthalene. | Co Cr | Blue. Gray. |
| 6 | 2-amino-1-hydroxy-4-chloro-benzene-5-sulfonic acid-(2'-carboxy)-phenylamide. | 2-benzylamino-naphthalene. | Co | Blue. |
| 7 | 2-amino-1-hydroxy-benzene-4-sulfonic acid-[(3'-carboxy)-naphthylamide-2']. | 2-methylamino-naphthalene. | Co | Do. |
| 8 | 2-amino-1-hydroxy-4-nitro-benzene-6-sulfonic acid-(2'-carboxy)-phenylamide. | 2-amylamino-naphthalene | Co | Blue-green. |
| 9 | 3-amino-4-hydroxy-1.1'-diphenylsulfone-2'-carboxylic acid. | 2-(3'-methoxy)-propylamino-naphthalene. | Co | Blue-gray. |
| 10 | 3-amino-4-hydroxy-1.1'-diphenylketone-2'-carboxylic acid. | 2-(2'-hydroxy)-ethylamino-naphthalene. | Co | Do. |
| 11 | 2-amino-1,4-dimethoxybenzene-5-sulfonic acid-(2'-carboxy)-phenylamide. | 2-phenylamino-naphthalene. | Co Cr | Blue. Gray. |
| 12 | 2-amino-1-hydroxy-benzene-4-4-sulfonic acid-N-methyl-N-(2'-carboxy)-phenylamide. | 2-cyclohexyl-aminonaphthalene. | Co | Blue-gray. |
| 13 | 2-amino-1-hydroxy-benzene-4-sulfonic acid-(2'-carboxy)-phenylamide. | 3-(4'-ethoxy)-phenylamino-naphthalene. | Co Cr | Blue-gray. Gray. |
| 14 | 2-amino-1-hydroxy benzene-4-sulfonic acid-N-ethyl-N-(2'carboxy)-phenylamide. | 2-(3'-bromo)-phenylamino-naphthalene. | Co | Blue-gray. |
| 15 | 2-amino-1-hydroxy-benzene-4-sulfonic acid-(2'-carboxy-4'-chloro)-phenylamide. | 2-ethylamino-naphthalene. | Co | Do. |
| 16 | 2-amino-1-hydroxy-benzene-4-sulfonic acid-(2'-carboxy)-phenylamide. | 2-iso-propylami-nonaphthalene. | Co | Do. |
| 17 | do | 2-(2'-hydroxy)-propylamino-naphthalene. | Co | Do. |
| 18 | do | 2-(2',4',6'-trimethyl)-phenyl-aminonaphthalene. | Co Cr | Blue-gray. Gray. |
| 19 | do | 2-(3'-methoxy)-butylamino-naphthalene. | Cr Co | Gray. Blue-gray. |
| 20 | do | 2-(2'-ethoxy)-ethylamino-naphthalene. | Co | Blue-gray. |
| 21 | do | 2-(2',4'-dimethyl)-phenylamino-naphthalene. | Co | Do. |
| 22 | do | 2-(2',5'-dimethyl)-phenylamino-naphthalene. | Co | Do. |
| 23 | do | 2-(4'-methyl)-cyclohexylami-nonaphthalene. | Co | Do. |
| 24 | do | 2-phenylethyla-minonaphthalene. | Co | Do. |
| 25 | do | 2-(naphthyl-2'-amino)-naphthalene. | Co | Do. |
| 26 | do | 2-(5',6',7',8'-tetrahydronaphthyl-2'-amino)-naphthalene. | Co | Do. |

EXAMPLE 27

43.2 parts (0.08 mol) of the metal-free dyestuff obtained according to Example 1 and 8.4 parts (0.02 mol) of the monoazo compound obtained by coupling diazotized 2-amino-1-hydroxy-4-nitrobenzene with 1-dimethyl-aminosulfonyl-amino-7-hydroxynaphthalene are added, together with 14.2 parts of crystallized cobaltous sulfate, to a melted mass of 60 parts of urea and 60 parts of formamide at 100°. The whole is stirred for 1 hour, after which time no further metal-free dyestuff is indicated. The cobalt-containing dyestuff thus formed is precipitated by diluting the mass with 300 parts of water, and is then filtered off and dissolved with 16 parts of sodium hydroxide in 1000 parts of water at 80°. By the addition of common salt it is precipitated from the solution, filtered off, dried and ground. It is a dark powder which is soluble in water to more than 50 g./l. and dyes wool, silk, synthetic polyamide fibers and leather in green-gray shades.

EXAMPLE 28

To 50 parts of formamide are added 5 parts of the monoazo dyestuff obtained from diazotized 2-amino-1-hydroxybenzene - 4 - sulfonic acid - (2' - carboxy) - phenylamide and 2-phenylamino-naphthalene, 1 part of the monoazo dyestuff produced from diazotized 2-amino-1-hydroxybenzene-4-sulfonic acid amide and 1-acetoacetylamino-2-ethylhexane, 4 parts of the disazo dyestuff produced from diazotized 3-amino-4-hydroxy-1.1'-azobenzene-3'-sulfonic acid amide and 1-carbo-(2'-ethoxy)-ethoxyamino-7-hydroxynaphthalene, and 3 parts of crystallized cobaltous sulfate. The mass is heated for 1 hour at 100°, after which time no further metal-free dyestuff is indicated. It is then diluted with 200 parts of water, causing the cobalt-containing dyestuff formed to be precipitated. It is filtered off and dissolved with 5 parts of sodium hydroxide in 200 parts of water at 60°, then precipitated from this solution with common salt, filtered off, dried and ground. It is a dark powder which dyes wool, silk, synthetic polyamide fibers and leather in blue-green shades.

In the following Table II details of the structural constitution of some particularly important mixed metal-complex dyestuffs are given. In column I the monoazo

*Table II*

| Example No. | (I) Monoazo compounds of formula I | (II) Metallizable azo compounds | (III) Mol ratio | (IV) Metal | (V) Shade of dyeing on wool |
|---|---|---|---|---|---|
| 29 | 2-amino-1-hydroxy-benzene-4-sulfonic acid-(2'-carboxy)-phenylamide → 2-(3'-chloro)-phenyl-aminonaphthalene. | 2-amino-1-hydroxy-5-nitrobenzene → 2-hydroxy-naphthalene. | 1:1 | Co | Navy blue. |
| 30 | ----do---- | 2-amino-1-hydroxy-5-nitrobenzene → 2-hydroxy-naphthalene.<br>2-amino-1-hydroxy-5-nitrobenzene → 2-phenylaminonaphthalene. | 2:1:1 | Co | Blue. |
| 31 | ----do---- | 1-amino-2-carboxy-benzene-4-sulfonic acid methylamide → 1-(3'-chloro)-phenyl-3-methyl-5-pyrazolone. | 2:1 | Cr | Olive. |
| 32 | ----do---- | 3-amino-4-hydroxy-1.1'-azobenzene-3'-sulfonic acid-amide → 1-carbo-(2'-ethoxy)-ethoxyamino-7-hydroxynaphthalene. | 1:1<br>1:1 | Co<br>Cr | Blue-olive.<br>Olive-gray. |
| 33 | ----do---- | 2-amino-1-hydroxy-4-nitrobenzene → 1-(dimethyl-amino-sulfonyl)-amino-7-hydroxynaphthalene. | 4:1 | Co | Gray. |
| 34 | 2-amino-1-hydroxy-benzene-4-sulfonic acid-(2'-carboxy)-phenylamide → 2-phenylaminonaphthalene. | 2-amino-1-hydroxy-benzene-4-sulfonic acid amide → 1-acetoacetylamino-2-ethylhexane. | 6:1 | Co | Green-blue. |
| 35 | ----do---- | 2-amino-1-hydroxy-5-nitrobenzene→2-hydroxynaphthalene.<br>1-amino-2-hydroxy-6-bromonaphthalene-4-sulfonic acid → 5.8-dichloro-1-hydroxynaphthalene. | 1:1:1 | Co | Blue. |
| 36 | 2-amino-1-hydroxy-benzene-4-sulfonic-acid-(2'-carboxy)-phenylamide → 2-phenylaminonaphthalene.<br>2-amino-1-hydroxy-benzene-4-sulfonic acid-(2'-carboxy)-phenylamide → 2-(3'-chloro)-phenylaminonaphthalene. | 2-amino-1-hydroxy-4-chlorobenzene → 2-phenylaminonaphthalene. | 1:1:1 | Co | Blue-gray. |
| 37 | 2-amino-1-hydroxy-benzene-4-sulfonic-acid-(2'-carboxy)-phenylamide → 2-phenylaminonaphthalene.<br>2-amino-1-hydroxy-benzene-4-sulfonic-acid-(2'-carboxy)-phenylamide → 2-(3'-chloro)-phenylaminonaphthalene. | 2-amino-1-hydroxy-4-nitrobenzene-6-sulfonic acid → 2-(3'-chloro)-phenylaminonaphthalene. | 1:2 | Co | Green-blue. |
| 38 | 2-amino-1-hydroxy-benzene-4-sulfonic-acid-(2'-carboxy)-phenylamide → 2-phenylaminonaphthalene.<br>2-amino-1-hydroxy-benzene-4-sulfonic acid-(2'-carboxy)-phenylamide → 2-(3'-chloro)-phenylaminonaphthalene. | 2-amino-1-hydroxy-5-nitrobenzene → 2-aminonaphthalene. | 1:1 | Co | Do. |
| 39 | 2-amino-1-hydroxy-4-sulfonic acid-(2'-carboxy)-phenylamide → 2-phenylaminonaphthalene. | 2-amino-1-hydroxy-4-nitrobenzene → 1-hydroxy-2-acetylamino-4-methylbenzene. | 1:4<br>1:2 | Co<br>Cr | Dark-brown.<br>Gray-brown. |
| 40 | ----do---- | 2-amino-1-hydroxy-4-nitrobenzene→2-hydroxynaphthalene.<br>2-amino-1-hydroxy-benzene-4-sulfonic acid-methylamide→1(3'-chloro)-phenyl-3-methyl-5-pyrazolone. | 2:3:1 | Co | Black-brown. |
| 41 | ----do---- | 2-amino-1-hydroxy-benzene-4-sulfonic acid-methylamide → 1-(3'-chloro)-phenyl-3-methyl-5-pyrazolone.<br>1-amino-2-carboxy-benzene-4-sulfonic acid-methylamide → 1(3'-chloro)-phenyl-3-methyl-5-pyrazolone. | 3:2:1 | Cr | Khaki. |
| 42 | 2-amino-1-hydroxy-benzene-4-sulfonic acid-(2'-carboxy)-phenylamide → 2-(3'-chloro)-phenylaminonaphthalene.<br>2-amino-1-hydroxy-benzene-4-sulfonic acid-(2'-carboxy)-phenylamide → 2-methylaminonaphthalene. | 3-amino-4-hydroxy-1.1'-azobenzene-2'-carboxylic acid→2-hydroxynaphthalene. | 1:1:2 | Co<br>Cr | Brown.<br>Gray |
| 43 | 2-amino-1-hydroxy-6-nitrobenzene-4-sulfonic acid-(2'-carboxy)-phenyl-amide → 2-phenylamino-naphthalene. | 3-amino-4-hydroxy-1.1'-azobenzene-3'-sulfonic acid amide → 1-dimethylaminosulfonylamino-7-hydroxynaphthalene. | 1:1 | Co | Olive. |
| 44 | 2-amino-1-hydroxy-4-chlorobenzene-5-sulfonic acid-(2'-carboxy)-phenyl-amide → 2-(4'-methyl)-phenylamino-naphthalene. | ----do---- | 1:1 | Co | Do. |
| 45 | 2-amino-1-hydroxy-benzene-4-sulfonic acid-(2'-carboxy)-phenylamide → 2-phenylaminonaphthalene. | 3-amino-2-hydroxy-5-methyl-1.1'-azobenzene-3'-sulfonic acid amide→2-hydroxynaphthalene. | 1:1 | Co<br>Cr | Blue.<br>Blue-gray. |
| 46 | ----do---- | 3-amino-4-hydroxy-1.1'-azobenzene → 2-hydroxy-naphthalene. | 2:1 | Co | Brown. | compound of the general Formula I is named, in column II the further metallizable azo compounds, in column III the molecular ratio of the monoazo compounds I and the azo compounds II used, in column IV the metal used, and the shades of the dyeings on wool are noted in column V.

Formulae of representative dyestuffs of the foregoing examples are as follows:

EXAMPLE 1

The 1:2 chromium and the 1:2 cobalt complex compounds of the monoazo dyestuff of the formula

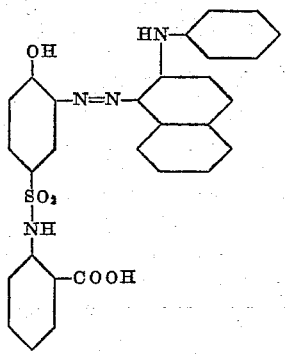

EXAMPLE 27

The 1:2 cobalt mixed complex compounds obtained from the mixture of the monoazo dyestuffs of the formulae

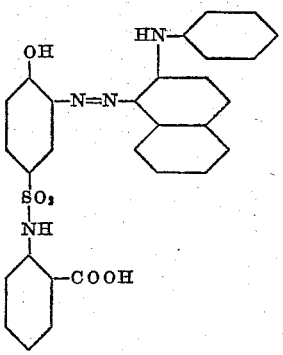

and

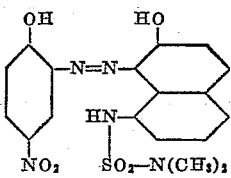

in the molecular proportion of 4:1.

EXAMPLE 28

The 1:2 cobalt mixed complex compounds obtained from the mixture of the azo dyestuffs of the formulae

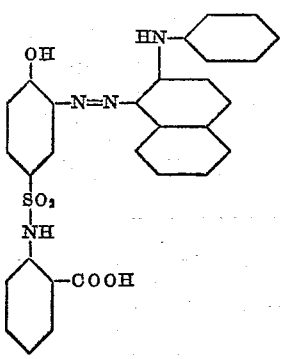

and

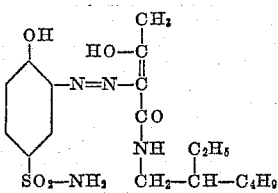

and

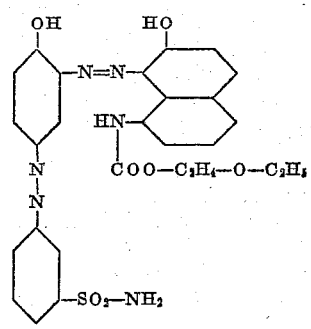

in the molecular proportion 4:1:3.

EXAMPLE 34

The 1:2 cobalt mixed complex compounds obtained from the mixture of the monoazo dyestuffs of the formulae

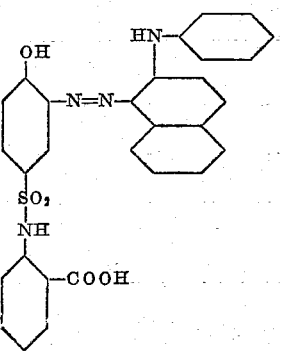

and

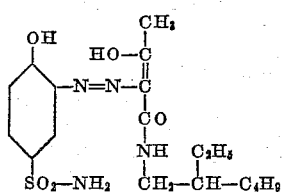

in the molecular proportion of 6:1.

EXAMPLE 41

The 1:2 chromium mixed complex compounds obtained from the mixture of the monoazo dyestuffs of the formulae

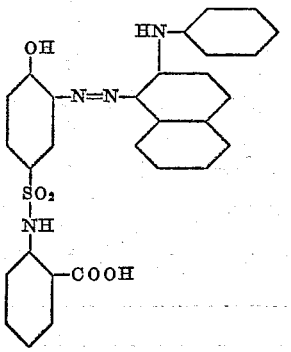

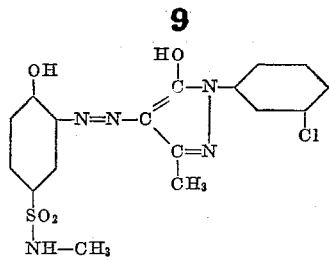

and

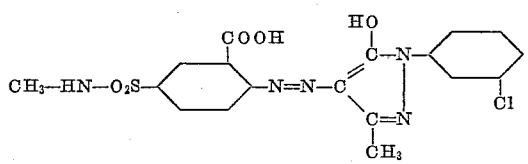

in the molecular proportion of 3:2:1.

Having thus disclosed the invention what I claim is:

1. A complex metal compound of an azo dyestuff free from sulfonic acid groups, which contains a metal selected from the group consisting of chromium and cobalt so bound in complex union to the axo dyestuff that the ratio of the number of metal atoms to the molecules of the azo dyestuff is about 1:2, the said azo dyestuff corresponding in the metal-free form to the formula

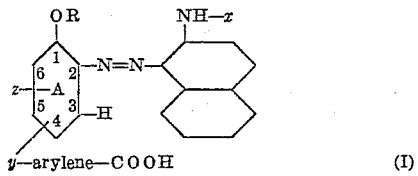

wherein

R represents a member selected from the group consisting of hydrogen and lower alkyl;

$x$ represents a member selected from the group consisting of cyclohexyl, methylcyclohexyl, phenylethyl, benzyl, phenyl, chlorophenyl, bromophenyl, lower alkylphenyl, lower di-alkylphenyl, lower trialkylphenyl and lower alkoxyphenyl;

$y$ represents a member selected from the group consisting of sulfonylimino and sulfonyl-N-lower alkylimino;

$z$ represents a member selected from the group consisting of hydrogen, chlorine, nitro and methoxy;

—$y$—arylene—COOH stands in one of the positions 4, 5 and 6 of the nucleus A; and arylene represents a member selected from the group consisting of
 (a) phenylene, and
 (b) chlorophenylene, with the —COOH group linked to each of (a) and (b) in one of the positions 2', 3' and 4' relative to —$y$—, and
 (c) naphthylene with the —COOH group linked in vicinal position to —$y$—.

2. A mixed dyestuff consisting essentially of complex metal compounds of azo dyestuffs free from sulfonic acid groups, which contain molecules of two different monoazo dyestuffs bound in complex union with atoms of a metal selected from the group consisting of chromium and cobalt, in a 2:1 relationship, and in which one of the two monoazo dyestuffs corresponds in the metal-free form to the formula

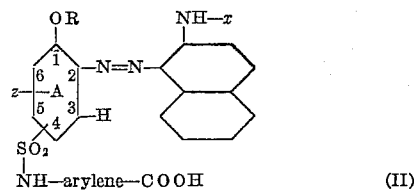

wherein

R represents a member selected from the group consisting of hydrogen and lower alkyl;

$x$ represents a member selected from the group consist-ing of cyclohexyl, methylcyclohexyl, phenylethyl, benzyl, phenyl, chlorophenyl, bromophenyl, lower alkylphenyl, lower di-alkylphenyl, lower tri-alkylphenyl and lower alkoxyphenyl;

$z$ represents a member selected from the group consisting of hydrogen, chlorine, nitro and methoxy;

—SO$_2$—NH—arylene—COOH stands in one of the positions 4, 5 and 6 of the nucleus A; and arylene represents a member selected from the group consisting of
 (a) phenylene, and
 (b) chlorophenylene, with the —COOH group linked to each of (a) and (b) in one of the positions 2', 3' and 4' relative to —NH—, and
 (c) naphthylene with the —COOH group linked in vicinal position to —NH—;

and the other monoazo dyestuff corresponds in the metal-free form to the formula $$R_1\text{—N=N—}R_2 \qquad (III)$$

wherein $R_1$ represents the radical of a diazo component of the benzene series bearing in ortho-position to the —N=N— group a substituent selected from the group consisting of —OH, —O— lower alkyl, and —COOH and $R_2$ represents the radical of a coupling component selected from the group consisting of a pyrazolone radical substituted with —OH in ortho-position to the —N=N— bridge in Formula III, an acetoacetylamino-alkane radical substituted with —OH in ortho-position to the —N=N bridge in Formula III, and a naphthalene radical substituted in ortho-position to the —N=N— bridge of Formula III with a member selected from the group consisting of —OH, —NH$_2$, and —NH—$x$, wherein $x$ has the same definition as in Formula II.

3. The 1:2 chromium complex compound of the monoazo dyestuff of the formula

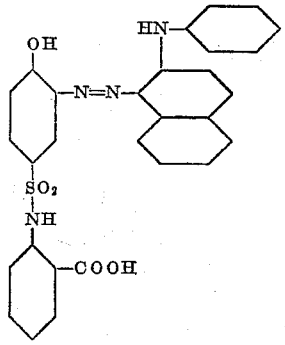

4. The 1:2 cobalt complex compound of the monoazo dyestuff of the formula

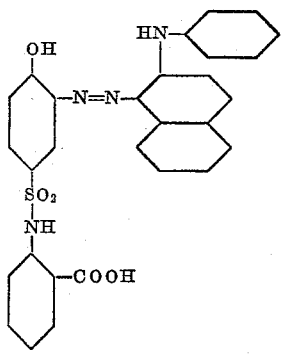

5. The 1:2 cobalt mixed complex compounds obtained from the mixture of the monoazo dyestuffs of the formulae

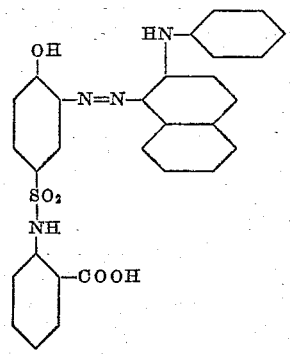

and

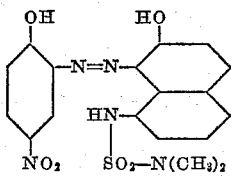

in the molecular proportion of 4:1.

6. The 1:2 cobalt mixed complex compounds obtained from the mixture of the monoazo dyestuffs of the formulae

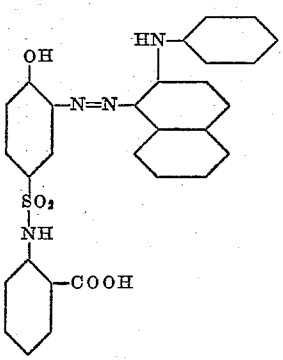

and

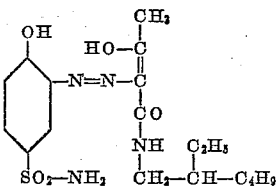

in the molecular proportion of 6:1.

7. The 1:2 chromium mixed complex compounds obtained from the mixture of the monoazo dyestuffs of the formulae

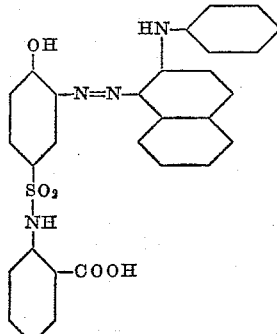

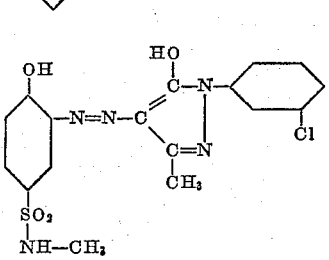

and

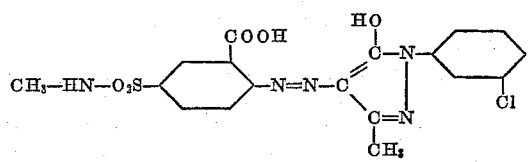

in the molecular proportion of 3:2:1.

References Cited in the file of this patent

UNITED STATES PATENTS

| | | |
|---|---|---|
| 2,822,360 | Ackermann | Feb. 4, 1958 |
| 2,970,137 | Whitlock | Jan. 31, 1961 |

FOREIGN PATENTS

| | | |
|---|---|---|
| 934,905 | Germany | Nov. 10, 1955 |
| 1,043,546 | Germany | Nov. 13, 1958 |